United States Patent
Ohmae et al.

(10) Patent No.: US 12,158,222 B2
(45) Date of Patent: Dec. 3, 2024

(54) GASKET AND FLOW PASSAGE JOINT STRUCTURE

(71) Applicant: NIPPON PILLAR PACKING CO., LTD., Osaka (JP)

(72) Inventors: Kiyotaka Ohmae, Osaka (JP); Masashi Katanaya, Osaka (JP); Ayumi Kurosaki, Osaka (JP); Shingo Higuchi, Osaka (JP); Kazukiyo Teshima, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 0 days.

(21) Appl. No.: 18/041,746

(22) PCT Filed: Jun. 4, 2021

(86) PCT No.: PCT/JP2021/021447
§ 371 (c)(1),
(2) Date: Feb. 15, 2023

(87) PCT Pub. No.: WO2022/059267
PCT Pub. Date: Mar. 24, 2022

(65) Prior Publication Data
US 2023/0349492 A1 Nov. 2, 2023

(30) Foreign Application Priority Data
Sep. 15, 2020 (JP) .................................. 2020-154758

(51) Int. Cl.
*F16L 17/067* (2006.01)
(52) U.S. Cl.
CPC .................................. *F16L 17/067* (2013.01)
(58) Field of Classification Search
CPC . F16L 17/067; F16L 23/02; F16J 15/10; F16J 15/062; F16J 15/104; F16J 15/061
See application file for complete search history.

(56) References Cited

U.S. PATENT DOCUMENTS 1,819,036 A * 8/1931 Oberhuber ............ F16L 23/024
220/240
3,554,581 A * 1/1971 Mason et al. ........... F16L 23/08
277/614

(Continued)

FOREIGN PATENT DOCUMENTS

JP     2006083972 A     3/2006
JP     2006316806 A     11/2006

(Continued)

OTHER PUBLICATIONS

International search report PCT/JP2021/021447 dated Aug. 17, 2021 (pp. 1-3).

*Primary Examiner* — Zachary T Dragicevich
*Assistant Examiner* — James A Linford
(74) *Attorney, Agent, or Firm* — Millen, White, Zelano & Branigan P.C.; William F. Nixon (57) ABSTRACT

A tapered surface is formed at each axially outer end portion of an inner circumferential surface of a gasket such that a diameter thereof gradually increases from an axially inner side toward an axially outer end thereof in a state before an annular primary sealing portion of the gasket is press-fitted into an annular primary sealing groove of a fluid device. A diameter increase starting point of the tapered surface is located in a range from a deformation starting point position serving as a starting point from which the inner circumferential surface is deformed due to the primary sealing portion receiving external force form the fluid device when the primary sealing portion is press-fitted into the primary sealing groove, to a center position in an axial direction of the inner circumferential surface.

2 Claims, 5 Drawing Sheets

(56) References Cited

U.S. PATENT DOCUMENTS

| | | | | |
|---|---|---|---|---|
| 5,466,018 | A | * | 11/1995 | Stobbart ............... F16L 23/167 |
| | | | | 277/614 |
| 10,948,083 | B2 | | 3/2021 | Nakano et al. |
| 11,073,209 | B2 | | 7/2021 | Takeda et al. |
| 11,572,951 | B2 | | 2/2023 | Adachi et al. |
| 2001/0045709 | A1 | * | 11/2001 | Stobbart ................ F16L 23/18 |
| | | | | 277/602 |
| 2015/0176744 | A1 | * | 6/2015 | Glassman ............. F16J 15/061 |
| | | | | 277/609 |

FOREIGN PATENT DOCUMENTS

| | | | |
|---|---|---|---|
| JP | 2018096457 A | 6/2018 | |
| JP | 2019173844 A | 10/2019 | |
| JP | 2019210984 A | 12/2019 | |
| WO | WO-2019163690 A1 * | 8/2019 | ............. F16J 15/061 |

* cited by examiner

GASKET AND FLOW PASSAGE JOINT STRUCTURE

TECHNICAL FIELD

The present invention relates to a gasket and a flow passage joint structure.

BACKGROUND ART

In a pipe path for fluids such as chemical solutions, high-purity liquids, ultrapure water, or cleaning solutions that are handled in manufacturing processes in various technical fields such as semiconductor manufacturing, medical/pharmaceutical manufacturing, and food processing/chemical industries, a gasket for preventing fluid leakage is used as a connection structure that connects flow passages formed in two fluid devices such as pumps, valves, accumulators, filters, flow meters, pressure sensors, and pipe blocks (see, for example, PATENT LITERATURE 1).

Figure 4:
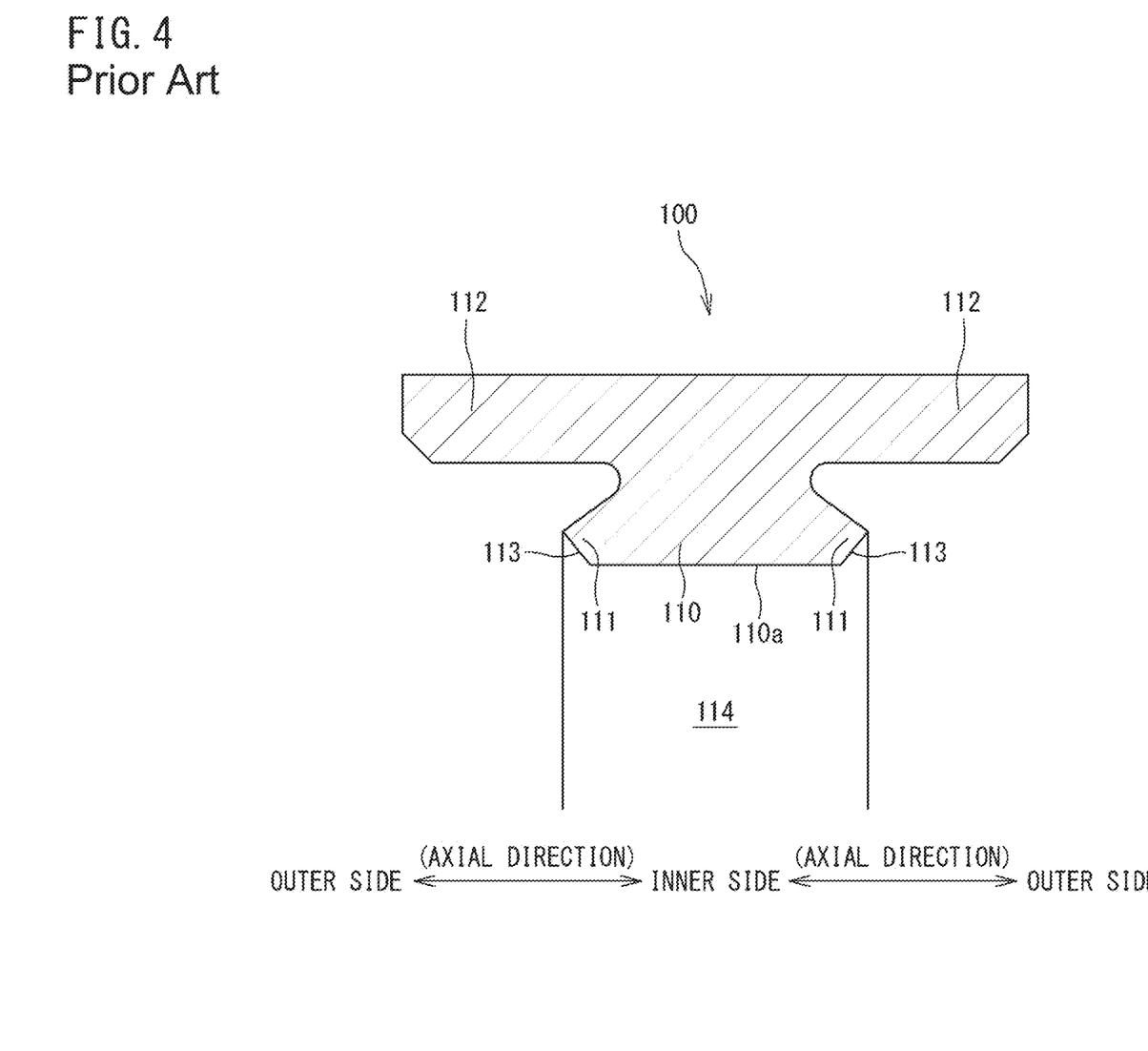
FIG. 4 is an axial cross-sectional view showing a conventional gasket.

FIG. 4 is an axial cross-sectional view showing a conventional gasket. A conventional gasket 100 includes a cylindrical body portion 110, a pair of annular primary sealing portions 111 formed at both axial end portions of the body portion 110 on the radially inner side so as to project toward the axially outer sides, and a pair of annular secondary sealing portions 112 formed at both axial end portions of the body portion 110 on the radially outer side so as to project toward the axially outer sides. A tapered surface 113 is formed at each axially outer end portion of the inner circumferential surface of the gasket such that the diameter thereof gradually increases from the axially inner side toward the axially outer end thereof.

CITATION LIST

Patent Literature

PATENT LITERATURE 1: Japanese Laid-Open Patent Publication No. 2019-173844

SUMMARY OF THE INVENTION

Technical Problem

Figure 5:
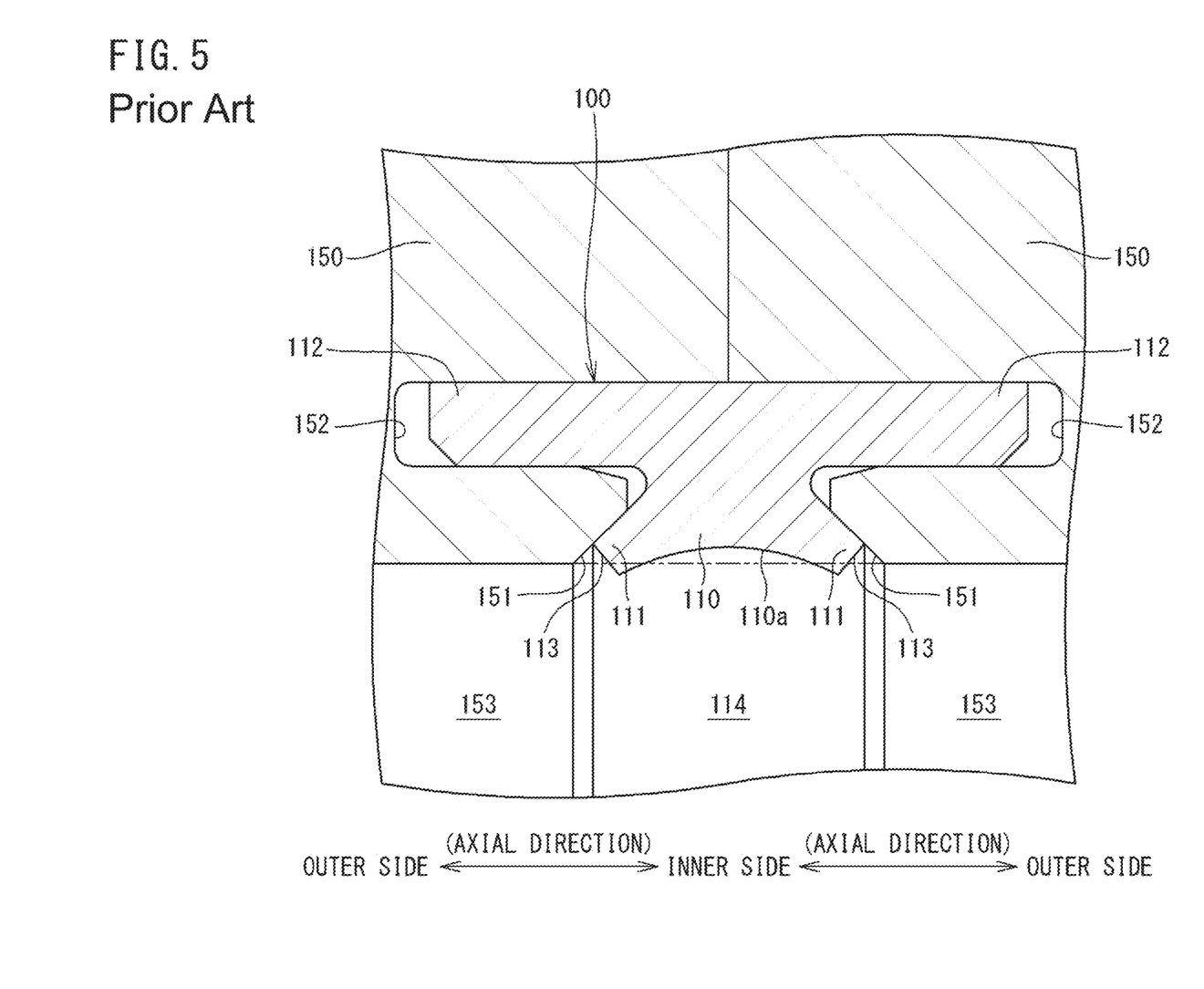
FIG. 5 is an axial cross-sectional view showing a use state of the conventional gasket.

FIG. 5 is an axial cross-sectional view showing a state where flow passages 153 formed in two fluid devices 150 are connected to each other by the conventional gasket 100. The internal space of the body portion 110 is a fluid flow passage 114 which provides communication between the flow passages 153 of both fluid devices 150. The primary sealing portions 111 and the secondary sealing portions 112 are press-fitted into annular primary sealing grooves 151 and secondary sealing grooves 152 formed on the respective fluid devices 150. Accordingly, sealing performance between each fluid device 150 and the gasket 100 is ensured, so that fluid leakage can be prevented.

However, as shown in FIG. 5, the primary sealing portions 111 of the gasket 100 are deformed so as to fall down toward the radially inner side by being pressed against the primary sealing grooves 151 of the fluid devices 150. Accordingly, the axially outer end portions of the inner circumferential surface of the gasket 100 protrude into the fluid flow passage 114, so that the replacement characteristics of a fluid flowing through the fluid flow passage 114 are reduced, causing adverse effects such as taking time for flushing the inside of the gasket 100.

The present invention has been made in view of such circumstances, and an object of the present invention is to allow axially outer end portions of an inner circumferential surface of a gasket to be inhibited from protruding into a fluid flow passage.

Solution to Problem

The present invention is directed to a gasket for connecting flow passages formed in two fluid devices, respectively, the gasket including, on both axial sides thereof, a pair of annular sealing portions to be press-fitted into annular sealing grooves formed at connection end portions of the flow passages of both fluid devices, respectively, the gasket having a fluid flow passage formed on a radially inner side of an inner circumferential surface thereof, wherein the gasket includes a tapered surface formed at each of axially outer end portions of the inner circumferential surface such that a diameter thereof gradually increases from an axially inner side toward an axially outer end thereof in a state before the sealing portion is press-fitted into the sealing groove, and a diameter increase starting point of the tapered surface is located on a deformation starting point position, which serves as a starting point from which the inner circumferential surface is deformed due to the sealing portion receiving external force from the fluid device when the sealing portion is press-fitted into the sealing groove, to a center position in an axial direction of the inner circumferential surface.

In the gasket of the present invention, the diameter increase starting point of the tapered surface formed at each axially outer end portion of the inner circumferential surface of the gasket is located on the axially inner side from the deformation starting point position which serves as a starting point from which the inner circumferential surface is deformed due to the sealing portion receiving external force from the fluid device. Accordingly, a deformation margin for a portion on the axially outer side with respect to the deformation starting point position of the inner circumferential surface of the gasket to be deformed toward the radially inner side is ensured. Therefore, the axially outer end portion of the inner circumferential surface of the gasket can be inhibited from protruding into the fluid flow passage.

(2) Preferably, the diameter increase starting point of the tapered surface is located on the deformation starting point position.

In this case, on the axially outer side with respect to the deformation starting point position of the inner circumferential surface of the gasket, only the tapered surface for which a deformation margin toward the radially inner side is ensured is deformed toward the radially inner side. Therefore, the axially outer end portion of the inner circumferential surface of the gasket can be further inhibited from protruding into the fluid flow passage.

(3) According to another aspect, the present invention is directed to a flow passage joint structure including: the gasket according to the above (1) or (2) for connecting flow passages formed in two fluid devices, respectively; and a pair of annular sealing grooves which are formed at connection end portions of the flow passages of both fluid devices, respectively, and into which the sealing portions of the gasket are press-fitted, respectively.

The flow passage joint structure of the present invention achieves the same advantageous effects as those of the gasket.

Advantageous Effects of the Invention

According to the present invention, the axially outer end portions of the inner circumferential surface of the gasket can be inhibited from protruding into the fluid flow passage.

DETAILED DESCRIPTION

Next, a preferred embodiment of the present invention will be described with reference to the accompanying drawings.

Entire Configuration of Flow Passage Joint Structure

Figure 1:
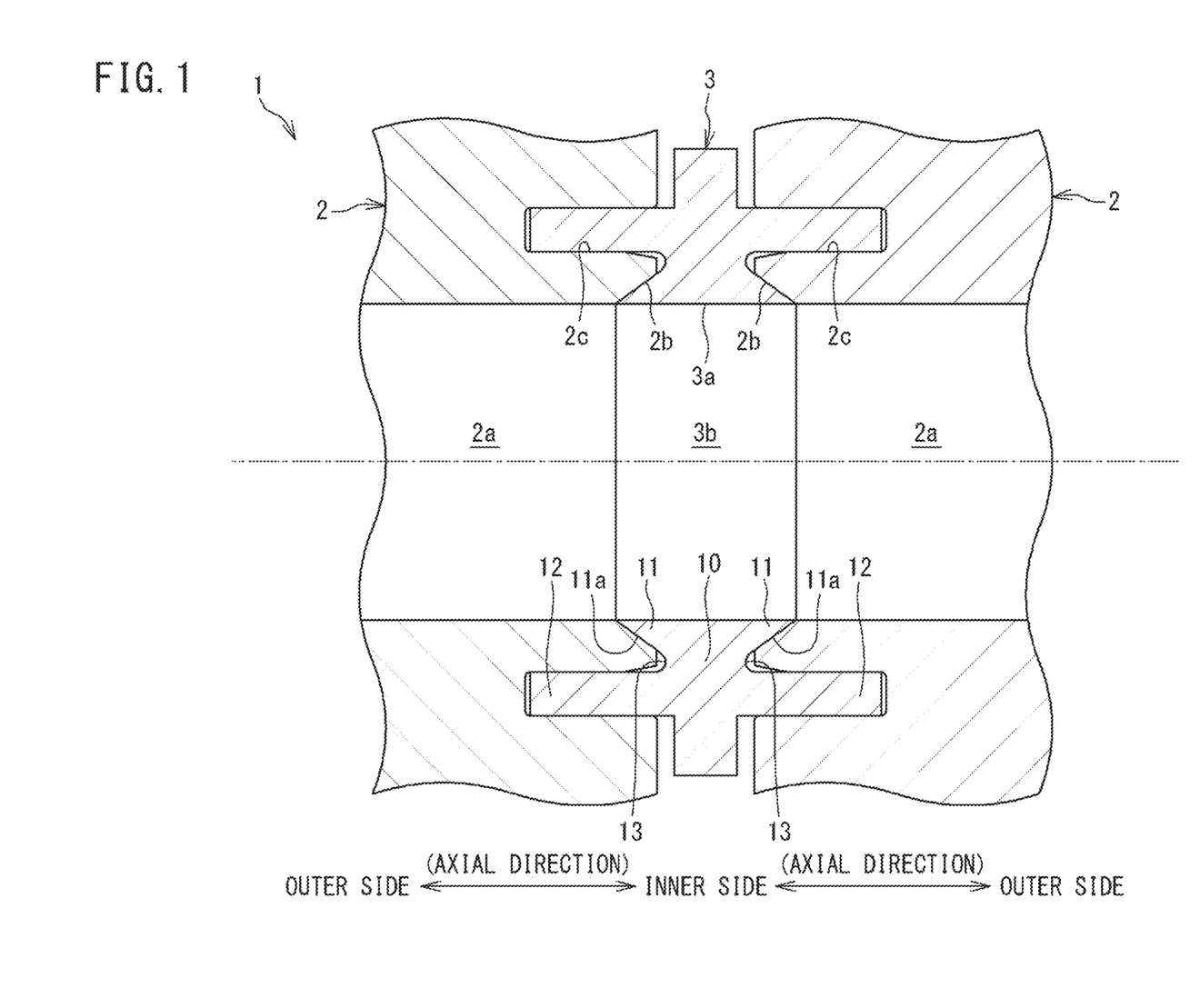
FIG. 1 is an axial cross-sectional view showing a flow passage joint structure according to an embodiment of the present invention.

FIG. 1 is an axial cross-sectional view showing a flow passage joint structure according to an embodiment of the present invention. A flow passage joint structure 1 shown in FIG. 1 is used, for example, as a connection structure that connects flow passages 2a, 2a formed in two adjacent fluid devices 2, 2, respectively, in a pipe path through which a chemical solution used in a semiconductor manufacturing apparatus flows. Examples of each fluid device 2 of the present embodiment include a pump, a valve, an accumulator, a filter, a flow meter, a pressure sensor, a pipe block, etc.

The flow passage joint structure 1 includes a gasket 3, and annular primary sealing grooves (sealing grooves) 2b and cylindrical secondary sealing grooves 2c formed on the respective fluid devices 2. The gasket 3 is a sealing member that seals and connects the flow passages 2a, 2a of the two fluid devices 2, 2. Hereinafter, in the present embodiment, for convenience, the directions from the axial center toward both axial sides of the gasket 3 are referred to as an axially outer side, and the directions from both axial sides toward the axial center of the gasket 3 are referred to as an axially inner side (the same applies to FIG. 2 and FIG. 3).

The primary sealing groove 2b of each fluid device 2 is formed on the circumferential surface of a connection end portion of the flow passage 2a in a tapered shape that is cut such that the diameter thereof gradually increases from the axially outer end thereof toward the axially inner end thereof. The secondary sealing groove 2c of each fluid device 2 is located on the radially outer side with respect to the primary sealing groove 2b in each fluid device 2, and is formed in a cylindrical shape.

Configuration of Gasket

Figure 2:
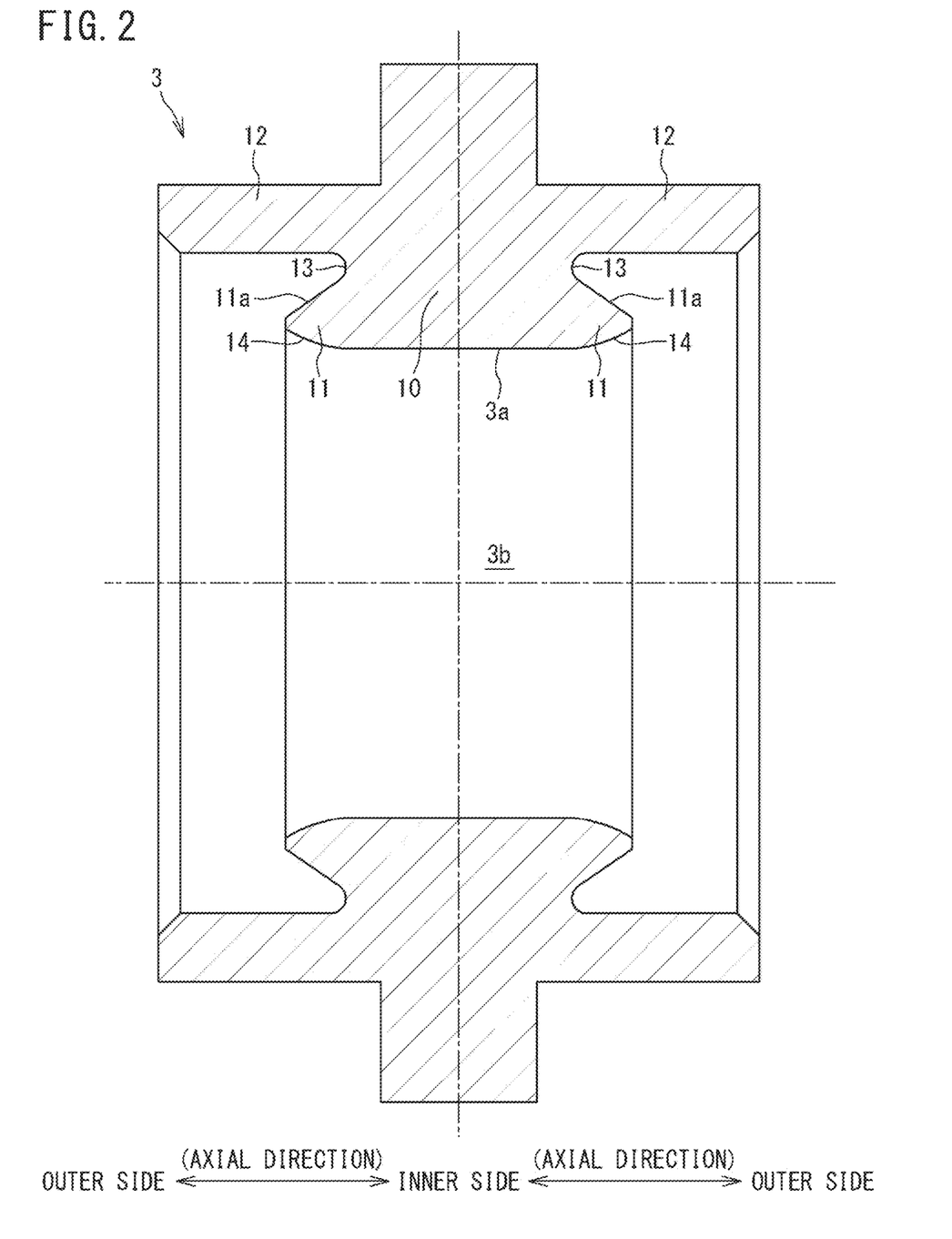
FIG. 2 is an axial cross-sectional view showing a gasket of the flow passage joint structure.

FIG. 2 is an axial cross-sectional view showing the gasket 3. The gasket 3 is formed from a synthetic resin material such as polyvinyl chloride (PVC), polypropylene (PP), polyethylene (PE), or a fluorine resin (perfluoroalkoxy alkane (PFA), polytetrafluoroethylene (PTFE), polyvinylidene fluoride (PVDF), or the like).

In FIG. 1 and FIG. 2, a fluid flow passage 3b is formed on the radially inner side of an inner circumferential surface 3a of the gasket 3. The fluid flow passage 3b provides communication between the flow passages 2a, 2a of the two fluid devices 2, 2. The gasket 3 includes a body portion 10 formed in a cylindrical shape, a pair of annular primary sealing portions (sealing portions) 11, and a pair of cylindrical secondary sealing portions 12.

The pair of primary sealing portions 11 are formed so as to project from the radially inner sides of outer end portions on both axial sides of the body portion 10, respectively, toward the axially outer side. An outer circumferential surface 11a of each primary sealing portion 11 is formed such that the diameter thereof gradually decreases from the axially inner end thereof toward the axially outer end thereof. Each primary sealing portion 11 is press-fitted into the primary sealing groove 2b of the corresponding fluid device 2.

The pair of secondary sealing portions 12 are formed so as to project from the radially outer sides of the outer end portions on both axial sides of the body portion 10, respectively, toward the axially outer side. Each secondary sealing portion 12 is formed in a cylindrical shape and press-fitted into the secondary sealing groove 2c of the corresponding fluid device 2. An annular groove 13 is formed between each primary sealing portion 11 and each secondary sealing portion 12 so as to have an arc cross-sectional shape.

With the above configuration, since the pair of primary sealing portions 11 and the pair of secondary sealing portions 12 of the gasket 3 are press-fitted into the primary sealing grooves 2b and the secondary sealing grooves 2c of the respective fluid devices 2, sealing performance at a connection portion between the flow passages 2a, 2a in the two fluid devices 2, 2 can be ensured by the gasket 3.

Inner Circumferential Surface of Gasket

FIG. 2 is an axial cross-sectional view showing the gasket 3, and shows a state before the primary sealing portions 11 and the secondary sealing portions 12 are press-fitted into the primary sealing grooves 2b and the secondary sealing grooves 2c of the respective fluid devices 2. As shown in FIG. 2, the gasket 3 includes a pair of tapered surfaces 14 formed at outer end portions on both axial sides of the inner circumferential surface 3a, respectively.

Each tapered surface 14 is formed at the axially outer end portion of the inner circumferential surface 3a such that the diameter thereof gradually increases from the axially inner side toward the axially outer end thereof. The tapered surface 14 of the present embodiment is formed, for example, so as to be inclined in a curved shape in a cross-sectional view. The tapered surface 14 may be formed so as to be inclined in a linear shape in a cross-sectional view.

Figure 3:
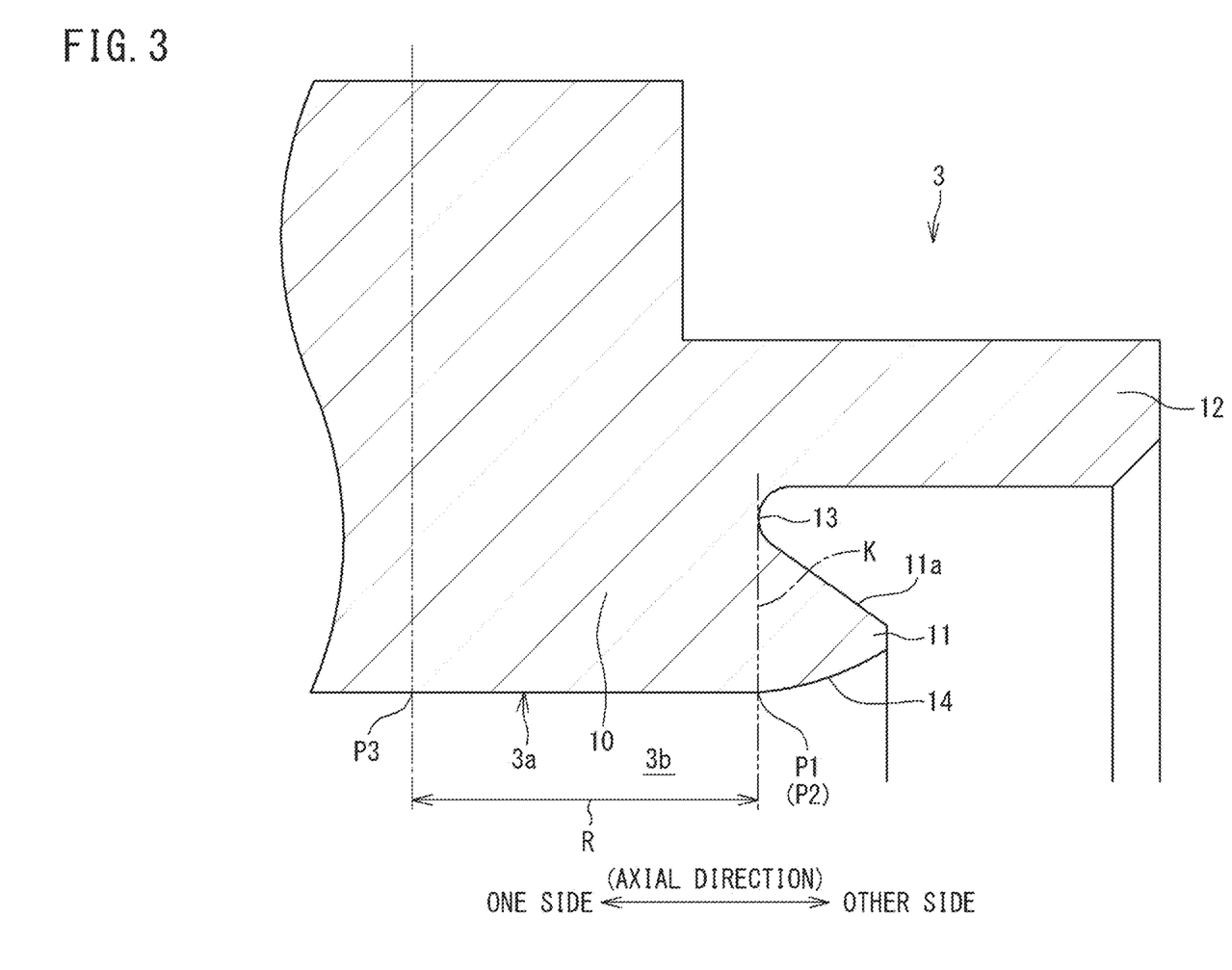
FIG. 3 is an enlarged cross-sectional view of a main part of FIG. 2, showing a tapered surface in an inner circumferential surface of the gasket.

FIG. 3 is an enlarged cross-sectional view of a main part of FIG. 2, showing the tapered surface 14 in the inner circumferential surface 3a of the gasket 3. In FIG. 3, a diameter increase starting point P1 of the tapered surface 14 is preferably located in a range R from a deformation starting point position P2 of the inner circumferential surface 3a to a center position P3 in the axial direction of the inner circumferential surface 3a. Here, "in a range R from a deformation starting point position P2 . . . to a center position P3" means to also include the position on the deformation starting point position P2 and the position on the center position P3.

In the present embodiment, the diameter increase starting point P1 of the tapered surface 14 is located on the deformation starting point position P2 in the range R. The deformation starting point position P2 is a position serving as a starting point from which the axially outer end portion of the inner circumferential surface 3a of the gasket 3 is deformed so as to fall down toward the radially inner side due to the primary sealing portion 11 receiving external force from the corresponding fluid device 2 via the primary sealing groove 2b when the primary sealing portion 11 is press-fitted into the primary sealing groove 2b. The deformation starting point position P2 in the present embodiment is located at the point of intersection of the inner circumferential surface 3a and a virtual tangent line K which is tangent to the annular groove 13 and extends in the radial direction.

With the above configuration, at the axially outer end portion of the inner circumferential surface 3a of the gasket 3, a portion on the axially outer side with respect to the deformation starting point position P2 is deformed so as to fall down toward the radially inner side. Since the portion on the axially outer side is formed as the tapered surface 14 whose diameter gradually increases from the axially inner end thereof (diameter increase starting point P1) toward the axially outer end thereof, a deformation margin for the portion on the axially outer side to fall down is ensured on the radially inner side of the tapered surface 14.

As shown in FIG. 1, when each primary sealing portion 11 is press-fitted into the primary sealing groove 2b, each entire tapered surface 14 is deformed so as to fall down toward the radially inner side, whereby each tapered surface 14 in the present embodiment extends straight in the axial direction along the inner circumferential surface 3a on the axially inner side with respect to the diameter increase starting point P1. Therefore, when each primary sealing portion 11 is press-fitted into the primary sealing groove 2b, even if each axially outer end portion of the inner circumferential surface 3a of the gasket 3 is deformed so as to fall down toward the radially inner side, the axially outer end portion does not protrude into the fluid flow passage 3b.

Advantageous Effects of Present Embodiment

In the flow passage joint structure 1 of the present embodiment, the diameter increase starting point P1 of the tapered surface 14 formed at each axially outer end portion of the inner circumferential surface 3a of the gasket 3 is located in the range R from the deformation starting point position P2, which serves as a starting point from which the inner circumferential surface 3a is deformed due to the primary sealing portion 11 receiving external force from the fluid device 2, to the center position P3 in the axial direction of the inner circumferential surface 3a. Accordingly, the deformation margin for the portion on the axially outer side with respect to the deformation starting point position P2 of the inner circumferential surface 3a of the gasket 3 to be deformed toward the radially inner side is ensured. Therefore, the axially outer end portion of the inner circumferential surface 3a of the gasket 3 can be inhibited from protruding into the fluid flow passage 3b, so that it is possible to suppress a reduction in the replacement characteristics of a fluid flowing through the fluid flow passage 3b.

Moreover, in the present embodiment, the diameter increase starting point P1 of the tapered surface 14 is located on the deformation starting point position P2 in the range R. Accordingly, on the axially outer side with respect to the deformation starting point position P2 of the inner circumferential surface 3a of the gasket 3, only the tapered surface 14 for which a deformation margin toward the radially inner side is ensured is deformed toward the radially inner side. Therefore, the axially outer end portion of the inner circumferential surface 3a of the gasket 3 can be further inhibited from protruding into the fluid flow passage 3b, so that it is possible to further suppress a reduction in the replacement characteristics of a fluid flowing through the fluid flow passage 3b.

Others

The gasket 3 of the above embodiment includes the primary sealing portions 11 and the secondary sealing portions 12. However, it is sufficient that the gasket 3 includes at least the primary sealing portions 11. In addition, it is sufficient that in the gasket 3, the tapered surface 14 is formed at at least one of the pair of primary sealing portions 11 on both axial sides. Moreover, the flow passage joint structure and the gasket of the present invention can also be applied to the liquid crystal/organic EL field, the medical/pharmaceutical field, automotive-related fields, etc., in addition to a semiconductor manufacturing apparatus.

The embodiment disclosed herein is merely illustrative in all aspects and should not be recognized as being restrictive. The scope of the present invention is defined by the scope of the claims rather than the meaning described above, and is intended to include meaning equivalent to the scope of the claims and all modifications within the scope.

REFERENCE SIGNS LIST flow passage joint structure
2 fluid device
2a flow passage
2b primary sealing groove (sealing groove)
3 gasket
3a inner circumferential surface
3b fluid flow passage
11 primary sealing portion (sealing portion)
14 tapered surface
P1 diameter increase starting point
P2 deformation starting point position
P3 center position
R range

The invention claimed is:

1. A gasket connecting flow passages formed in two fluid devices, respectively, the gasket comprising, on both axial sides thereof, a pair of annular primary sealing portions to be press-fitted into annular primary sealing grooves formed at connection end portions of the flow passages of both fluid devices, respectively, the gasket having a fluid flow passage formed on a radially inner side of an inner circumferential surface thereof, the gasket comprising, on both axial sides thereof, a pair of cylindrical secondary sealing portions to be press-fitted into cylindrical secondary sealing grooves respectively formed at the connection end portions of the flow passages of both fluid devices, the pair of cylindrical secondary sealing portions being formed radially outward of the primary sealing grooves, wherein
an annular groove having an arc cross-sectional shape is formed between each of the primary sealing portions and a corresponding secondary sealing portion of the secondary sealing portions, a deformation starting point position being a starting point from which the inner circumferential surface is deformed because the primary sealing portion receiving external force from the fluid device when the primary sealing portion is press-fitted into the primary sealing groove is located at a point of intersection of the inner circumferential surface and a virtual tangent line which is tangent to the annular groove and extends in the radial direction of the inner circumferential surface, the gasket includes a tapered surface formed at each of axially outer end portions of the inner circumferential surface such that a diameter thereof gradually increases from an axially inner side toward an axially outer end thereof in a state before the primary sealing portion is press-fitted into the primary sealing groove, and a diameter increase starting point of the tapered surface is located in a range from the deformation starting point position to a center position in an axial direction of the inner circumferential surface.

2. The gasket according to claim 1, wherein the diameter increase starting point of the tapered surface is located on the deformation starting point position.

* * * * *